(12) United States Patent
Broberg et al.

(10) Patent No.: US 8,240,335 B1
(45) Date of Patent: Aug. 14, 2012

(54) FUELING VALVE FOR FUELING A REMOTE CONTROL VEHICLE

(75) Inventors: James E. Broberg, Crystal Lake, IL (US); Edward P. Bojan, Glenview, IL (US); David D. Gray, Lake Villa, IL (US); Stephen J. Wildkatsch, Grayslake, IL (US)

(73) Assignee: Du-Bro Products, Inc., Wauconda, IL (US)

( * ) Notice: Subject to any disclaimer, the term of this patent is extended or adjusted under 35 U.S.C. 154(b) by 643 days.

(21) Appl. No.: 12/483,680

(22) Filed: Jun. 12, 2009

(51) Int. Cl.
*F16K 11/07* (2006.01)
(52) U.S. Cl. .............. 137/625.48; 137/625.69; 251/353; 123/DIG. 3
(58) Field of Classification Search ............. 137/625.48, 137/625.68, 625.69; 251/353; 123/437, 123/442, DIG. 3; 141/348–350
See application file for complete search history.

(56) References Cited

U.S. PATENT DOCUMENTS

| | | | |
|---|---|---|---|
| 2,460,633 A | 2/1949 | Franck | |
| 2,764,139 A * | 9/1956 | Gordon | 123/532 |
| 3,473,557 A * | 10/1969 | Loe | 137/343 |
| 3,545,479 A | 12/1970 | Loe | |
| 3,563,273 A | 2/1971 | Mills | |
| 4,202,330 A | 5/1980 | Jariabka | |
| 4,423,741 A | 1/1984 | Levy | |
| 4,819,684 A | 4/1989 | Zaugg et al. | |
| 5,098,405 A | 3/1992 | Peterson et al. | |
| 5,147,333 A | 9/1992 | Raines | |
| 5,638,803 A * | 6/1997 | Chang | 123/676 |
| 5,971,021 A | 10/1999 | Graham | |
| 6,681,806 B2 * | 1/2004 | Isobe | 137/625.65 |
| 7,044,440 B2 * | 5/2006 | Yang | 251/145 |
| 7,195,030 B2 | 3/2007 | Chen | |
| 7,213,616 B2 | 5/2007 | Wuollet et al. | |

* cited by examiner

*Primary Examiner* — John Fox
(74) *Attorney, Agent, or Firm* — Mathew R. P. Perrone, Jr.

(57) ABSTRACT

A fueling valve for fueling a remote or radio-controlled vehicle or removing fuel therefrom has a sliding member in a cylinder to permit fuel to placed or removed from a vehicle as desired. Such a fueling valve greatly simplifies the transportation of the vehicle.

18 Claims, 6 Drawing Sheets

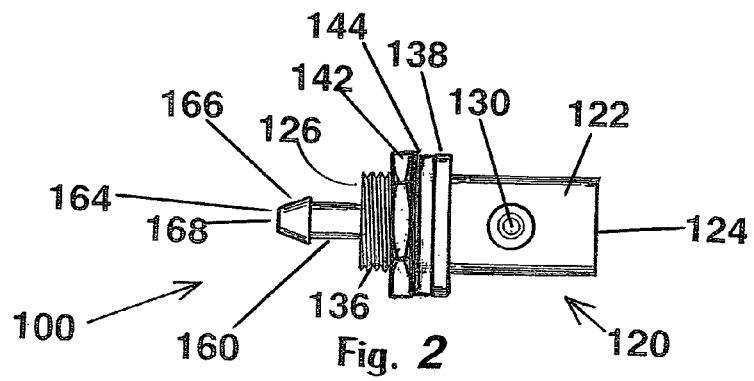
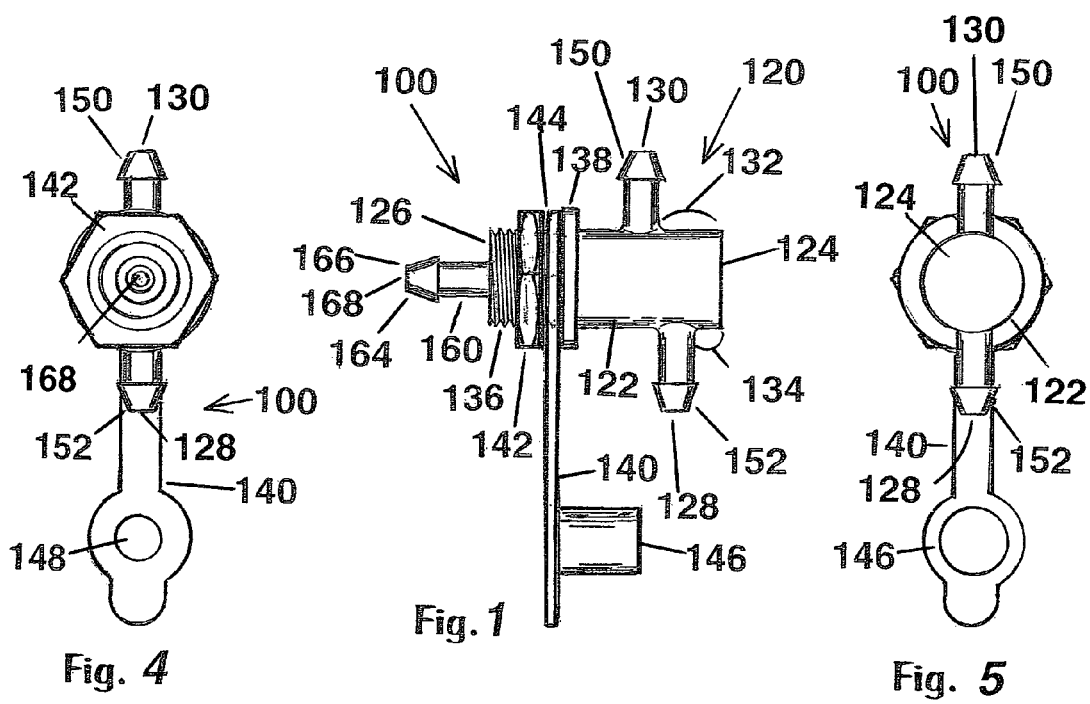
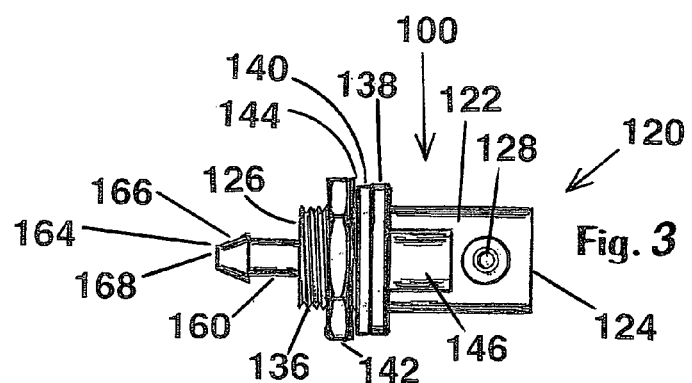

FUELING VALVE FOR FUELING A REMOTE CONTROL VEHICLE

This invention relates to a fueling valve for fueling a remote control vehicle and more particularly to a fueling valve for fueling a remote control vehicle, which permits both efficient filling of the vehicle fuel tank and removing of fuel from the fuel tank, while avoiding or prohibiting the passage of fuel to the engine.

BACKGROUND OF THE INVENTION

Radio-controlled, miniature vehicles are well known as amusement and competition devices. Such vehicles have miniature internal combustion engines. The miniature internal combustion engine requires accessories for supplying fuel to the engine. Some of the difficulties of fueling hobby equipment, such as remote controlled vehicles are discussed in U.S. Pat. No. 6,293,304, by the same inventor, incorporated herein by reference, and need not be discussed here.

Whether those radio-controlled miniature vehicles are aircraft, automobiles, boats, helicopters, or other vehicles; each vehicle has fueling complications in common. It is very desirable to transport those vehicles with an empty fuel tank. To that end, an efficient manner of adding fuel to and removing fuel from that vehicle is very desirable.

Another fueling problem is caused by the requirement that no fuel enter the engine, until absolutely desired. So during the fueling process on the input side, the fuel must be directed to the tank only. So, the fuel tank must be filled with the engine protected.

After the remote or radio-controlled miniature vehicle is used at a desired site, it is very desirable, if not required, to remove fuel from the vehicle before transporting the vehicle to a storage location. It is still desired to keep the fuel away from the engine and remove the fuel to a proper storage facility or tank prior to such transport.

It is furthermore desirable to have such features contained in a relatively simple, easy to operate structure or device or tool. The device must also be efficient, compact, and easily transported.

SUMMARY OF THE INVENTION

Among the many objectives of the present invention is the provision of a fueling valve for fueling a remote or radio controlled, miniature vehicle to control a flow of fuel to a desired area.

Another objective of the present invention is the provision of a fueling valve for fueling a remote or radio controlled, miniature vehicle to add fuel to a tank.

Yet another objective of the present invention is the provision of a fueling valve for fueling a remote or radio controlled, miniature vehicle to add fuel to a tank without the fuel flowing to the engine.

Still another objective of the present invention is the provision of a durable fueling valve for fueling a remote or radio-controlled, miniature vehicle to remove fuel therefrom.

These and other objectives of the invention (which other objectives become clear by consideration of the specification, claims and drawings as a whole) are met by providing a fueling valve for fueling a remote or radio-controlled vehicle or removing fuel therefrom.

BRIEF DESCRIPTION OF DRAWINGS

FIG. 1 depicts a front plan view of fueling valve 100 for fueling a remote or radio controlled, miniature vehicle 110 of this invention.

FIG. 2 depicts a top plan view of fueling valve 100 for fueling a remote or radio-controlled, miniature vehicle 110 based on FIG. 3.

FIG. 3 depicts a bottom plan view of fueling valve 100 for fueling a remote or radio controlled, miniature vehicle 110.

FIG. 4 depicts a left side plan view of fueling valve 100 for fueling a remote or radio controlled, miniature vehicle 110.

FIG. 5 depicts a right side view of fueling valve 100 for fueling a remote or radio controlled, miniature vehicle 110, rotated 180 degrees about the vertical axis as based on FIG. 4.

Throughout the figures of the drawings, where the same part appears in more than one figure of the drawings, the same number is applied thereto.

DESCRIPTION OF THE PREFERRED EMBODIMENTS

Figure 6:
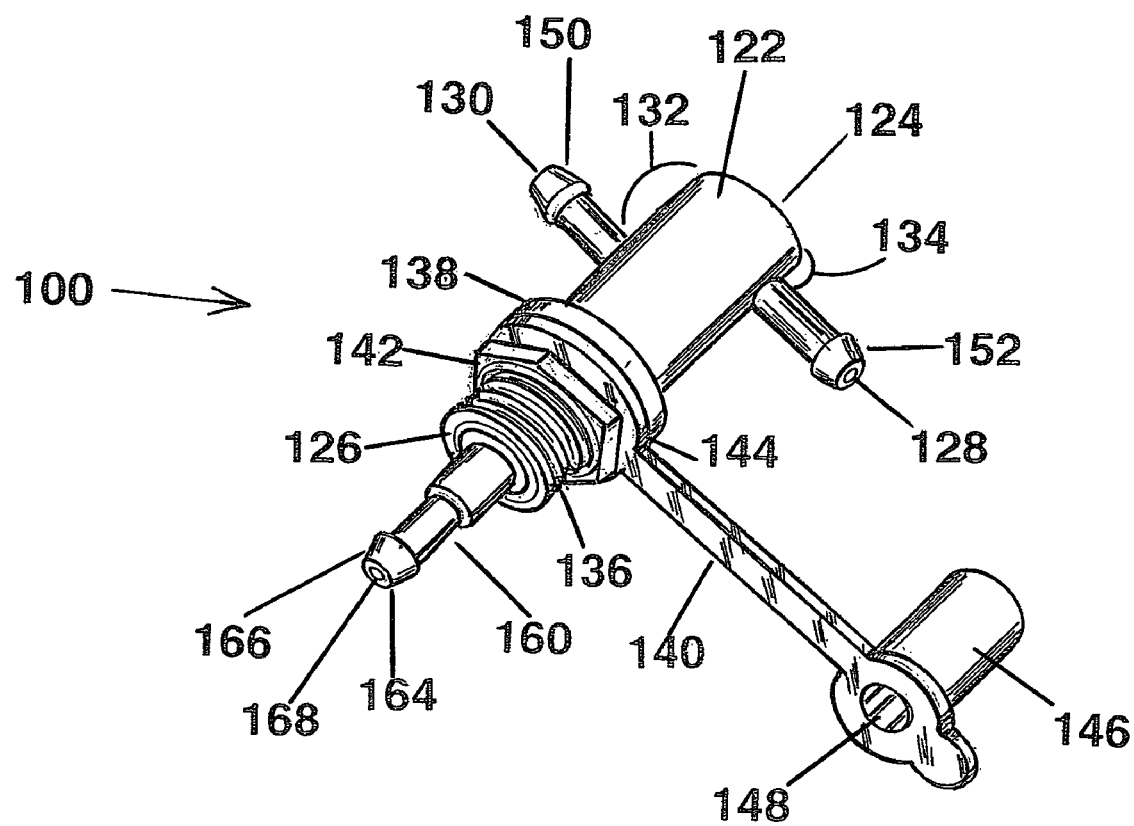
FIG. 6 depicts a top perspective view of fueling valve 100 for fueling a remote or radio controlled, miniature vehicle 110 of this invention.
Figure 7:
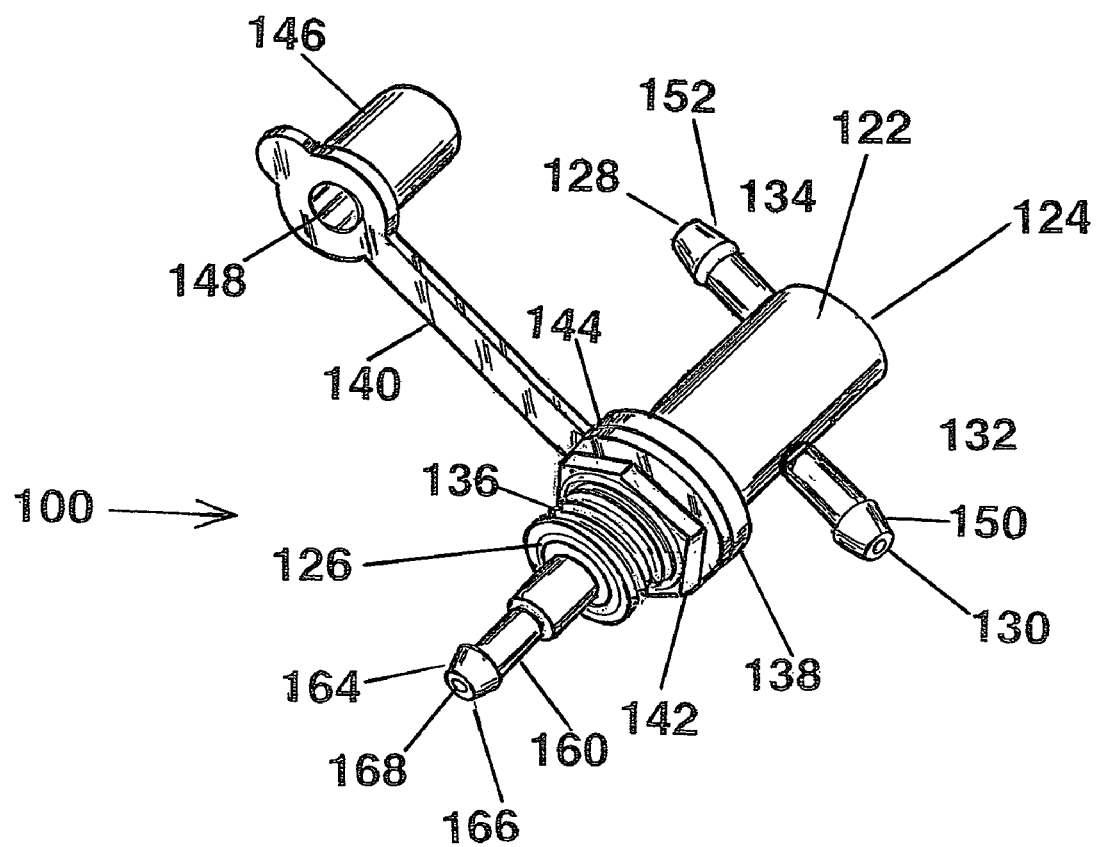
FIG. 7 depicts a bottom perspective view of fueling valve 100 for fueling a remote or radio controlled, miniature vehicle 110 of this invention.

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar to directional terms are not to be construed to limit the scope of the invention in any manner. The words attach, connect, couple, and similar terms with their inflectional morphemes do not necessarily denote direct or intermediate connections, but may also include connections through mediate elements or devices.

The fueling valve for fueling a remote or radio-controlled vehicle is secured in the fuel line of the vehicle. This fueling valve has a housing with a slidable member therein. The housing has a first port and a second port. The first port can communicate with the fuel tank of the vehicle. The second port can communicate with the carburetor of the vehicle or the fuel receiver for the engine of the vehicle. In the closed position, the slidable member permits flow with the fuel to the tank, while blocking the carburetor. In a running position, the slidable member permits flow with the fuel from the tank to carburetor on the vehicle.

Also, with the fueling valve in the closed position, a suction device can be applied to the sliding port to remove fuel from the tank and the carburetor so that the vehicle can be safely transported. Thus, the sliding member has two working positions in the valve. As above stated, this fueling valve is usable with various types of vehicles, including, but not limited to aircraft, automobiles, boats, helicopters, or other vehicles; especially those miniature or toy vehicles of the remote control or powered type.

In FIG. 1, FIG. 2, FIG. 3, FIG. 4, FIG. 5, FIG. 6 and FIG. 7, fueling valve 100 has a housing 120 with a sliding member 160 mounted therein. Housing 120 includes a housing cylinder 122, having a closed housing end 124, and an open housing end 126. Adjacent to closed housing end 124 on the exterior of housing cylinder 122 is a tank port 128 extending therefrom. Diametrically opposed to tank port 128 and also extending from housing cylinder 122 is carburetor port 130. A carburetor space 132, measuring the distance between closed housing end 124 and carburetor port 130 is greater than a tank space 134, which measures the distance between closed housing end 124 and tank port 128.

At open housing end 126, housing cylinder 122 has a male threaded member 136 for holding fueling valve 100 in a desired position. Adjacent to male threaded member 136 is an outer flange 138. Valve strap 142 fits over male threaded member 136 and is secured adjacent to outer flange 138 by nut 140. Valve strap 142 includes a housing aperture 144 to receive male threaded member 136 at one end. Valve strap 142 has a cover cylinder 146 at the other end thereof, with one end closed by valve strap 142.

Figure 8:
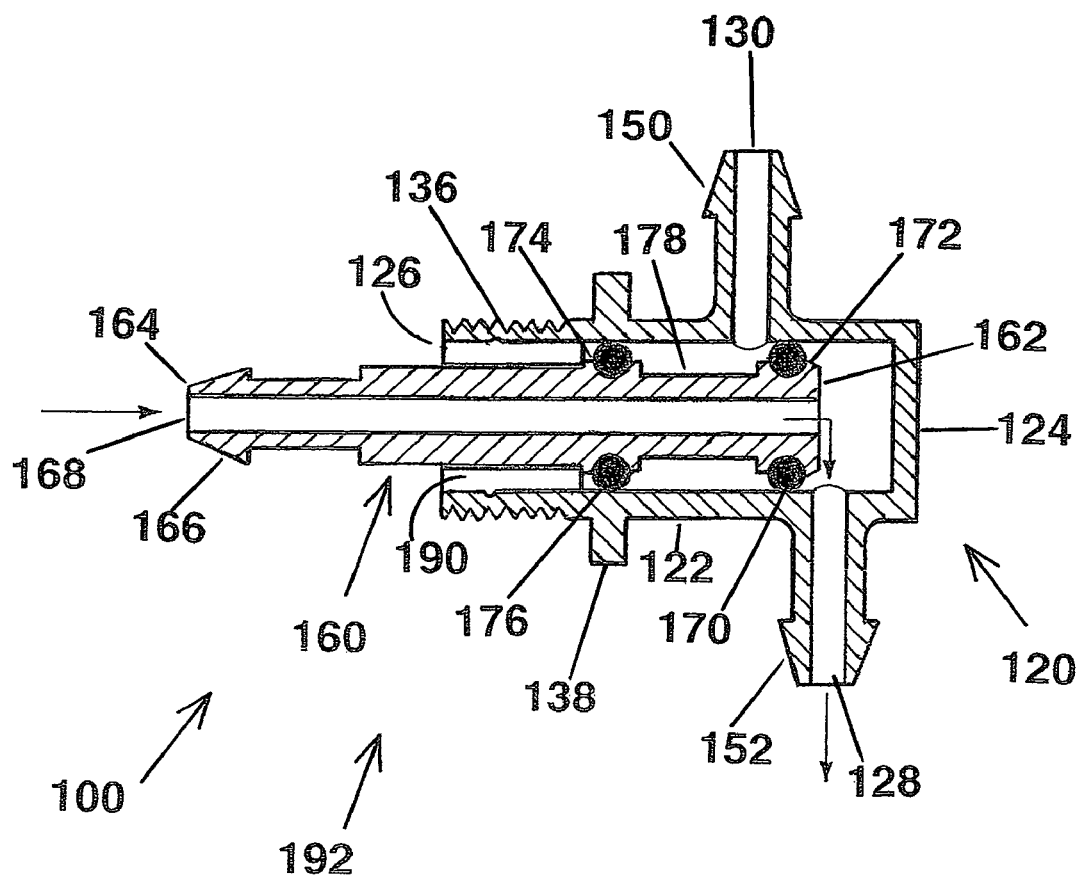
FIG. 8 depicts a front plan cross-sectioned view of fueling valve 100 for fueling a remote or radio controlled, miniature vehicle 110 based on FIG. 1, in fueling or closed position 192.

The cover cylinder 146 also has an open cover end 148 to receive supply nipple 166 (FIG. 8). Carburetor nipple 150 is an enlarged tip at the end of carburetor port 130 to assist in holding a fuel line or hose thereon. Fuel nipple 152 is an enlarged tip at the end of tank port 128 to assist in holding a fuel line or hose thereon. Supply nipple 166 is an enlarged tip at the end of fuel supply port end 164 to assist in holding a fuel line or hose thereon.

Figure 9:
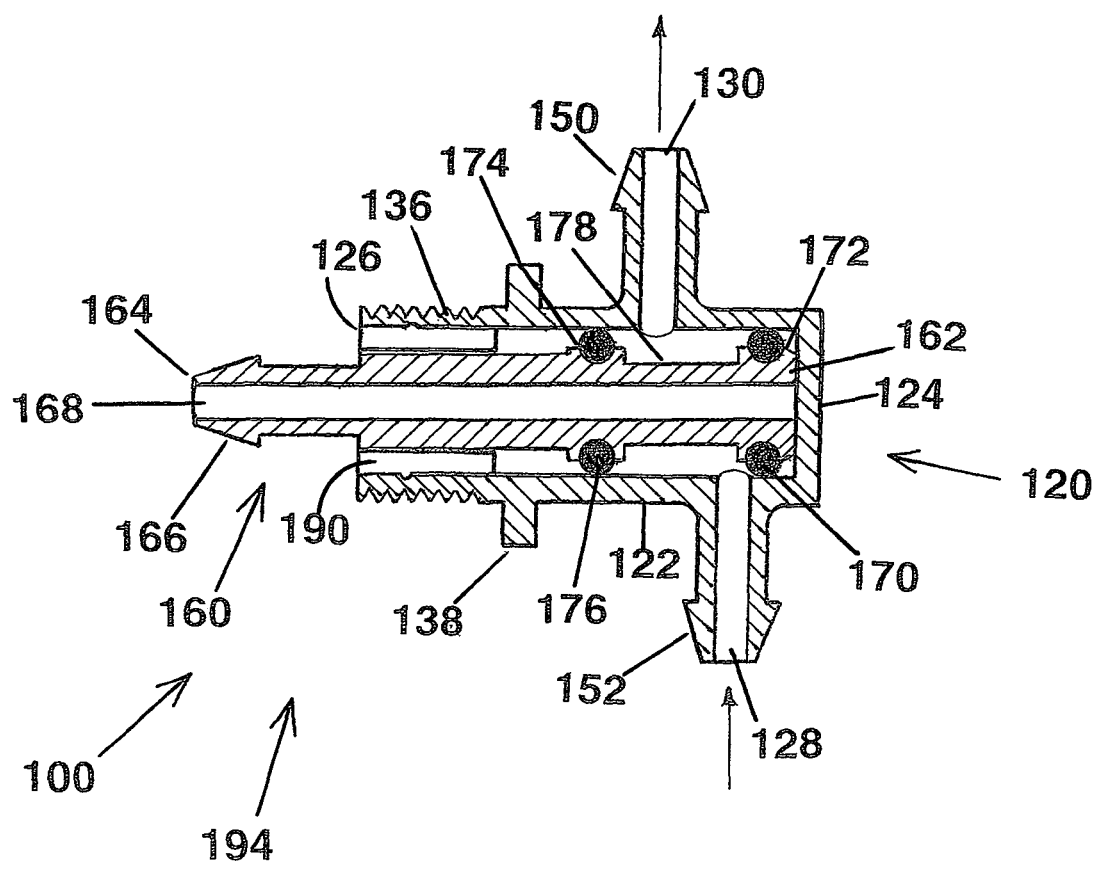
FIG. 9 depicts a front plan cross-sectioned view of fueling valve 100 for fueling a remote or radio controlled, miniature vehicle 110 based on FIG. 1, in open or running position 194.

Adding FIG. 8 and FIG. 9 to the consideration, sliding member 160 fits into open housing end 126. Sliding member 160 is also generally cylindrical and has a housing port end 162 and a fuel supply port end 164. Housing port end 162 approaches closed housing end 124. Fuel supply port end 164 extends from open housing end 126.

Sliding member 160 includes a fuel passage 168, as a hollow tube, communicating along the cylindrical axis on the sliding member 160. Adjacent to housing port end 162 is a first sealing O-ring 170 mounted in first O-ring slot 172. Spaced from first O-ring slot 172 is second O-ring slot 174 which receives second sealing O-ring 176. Between first sealing O-ring 170 and second sealing O-ring 176 is an indented passage 178, which spaces the sliding member 160 from housing 120 and permits fuel to pass from tank port 128 to carburetor port 130, to reach engine 114 (FIG. 9).

Contained cap or sealing member 190 slides into housing 120 in a secure fashion at open housing end 126 and cooperates with sliding member 160 to secure sliding member 160 therein, due to the presence of second sealing O-ring 176. With first sealing O-ring 170 positioned between carburetor port 130 and tank port 128 in closed position 192, fuel may pass into tank 112 (FIG. 10).

With first sealing O-ring 170 positioned adjacent to closed housing end 124 carburetor port 130 and tank port 128, fuel may pass from tank 112 (FIG. 10) through indented passage 178 of sliding member 160 into carburetor port 130, to permit miniature vehicle 110. In this manner, fueling valve 100 for fueling a remote or radio controlled, miniature vehicle 110 (FIG. 10) based on FIG. 1, is in open or running position 194, so that the engine 114 of miniature vehicle 110 may run.

Figure 10:
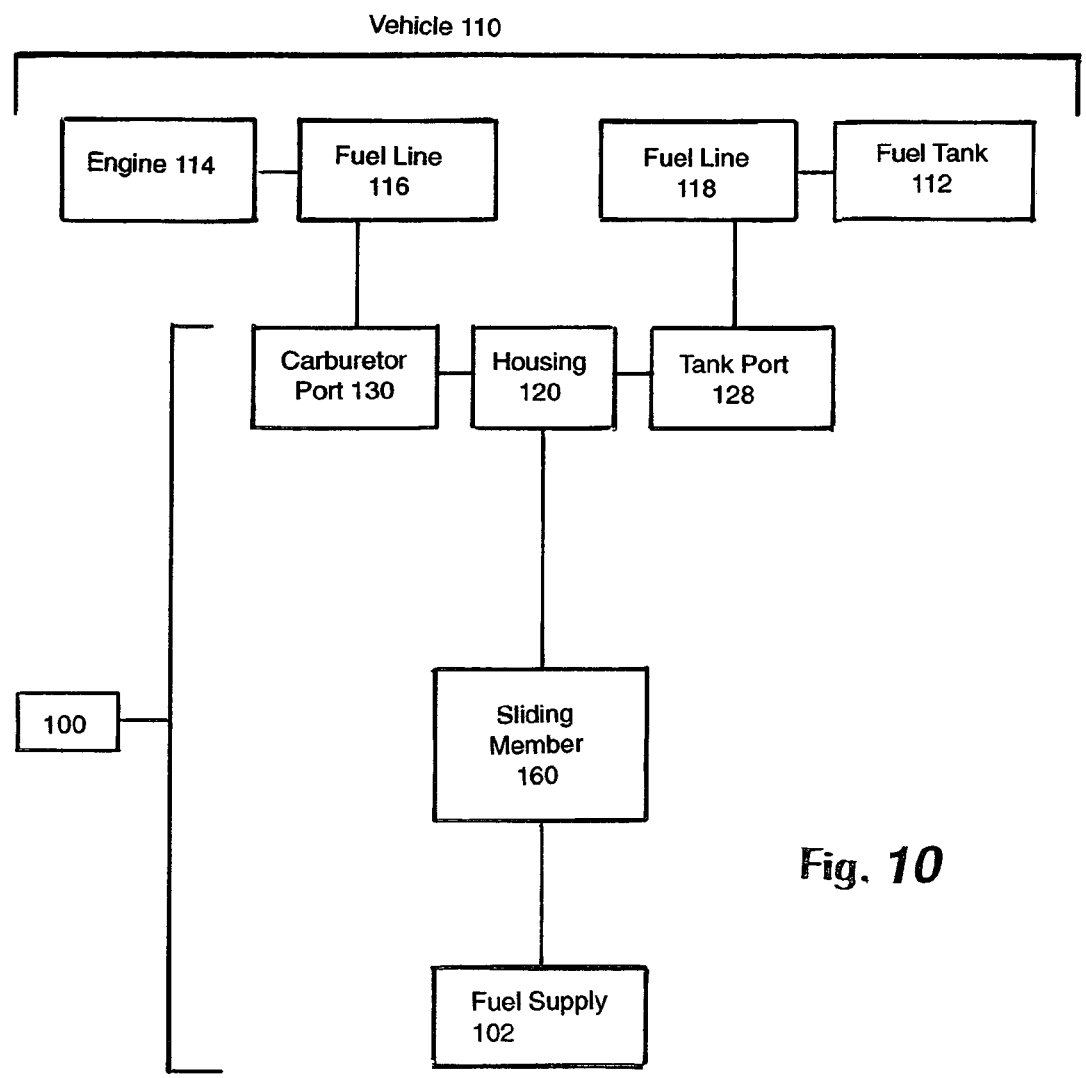
FIG. 10 depicts a block diagram of the fueling valve 100 for fueling a remote or radio controlled, miniature vehicle 110.

Now adding FIG. 10 to the consideration, the structure of the fueling valve 100 becomes more clear. Miniature vehicle 110 requires a fuel tank 112 connected to an engine 114 by a fuel line. For this invention, the fuel line is divided into a first fuel line 116 adjacent and connected to engine 114 of miniature vehicle 110, and a second fuel line 118 adjacent to and connected to fuel tank 112. Fueling valve 100 of this invention connects first fuel line 116 to second fuel line 118.

More particularly, housing 120 has tank port 128 of housing 120 connected to second fuel line 118. In a like manner, carburetor port 130 is connected to first fuel line 116. As sliding member 160 moves back and forth in housing 120, fuel valve 100 goes between closed position 192 (FIG. 8 for example) and open position 194 (FIG. 9 for example).

In closed position 192, fuel passes from the fuel supply 102 to tank port 128 in housing 120 by passing through fuel passage 168, into second fuel line 118, finally into fuel tank 112. During this transfer, carburetor port 130 is blocked. It is also possible at this point or subsequently to reverse the pressure on sliding member 160 and withdraw fuel from the miniature vehicle 110. As sliding member moves to open position 194 (FIG. 9 for example), fuel flow from fuel tank 112 reaches second fuel line 118, tank port 128, housing 120, carburetor port, second fuel line 118, and then engine 114. This permits the engine 114 to start and miniature vehicle 110 to be used.

This application—taken as a whole with the abstract, specification, claims, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this tool can become clear to a person having ordinary skill in this particular art. Such modifications are clearly covered by this disclosure.

What is claimed and sought to be protected by Letters Patent is:

1. A fueling valve for fueling a remote or radio controlled, miniature vehicle comprising:
    a) the fueling valve having a housing and a slidable member;
    b) the housing receiving the slidable member;
    c) the housing having a first port and a second port;
    d) the first port being adapted to communicate with a fuel tank of the vehicle;
    e) the second port being adapted to communicate with a fuel receiver for an engine of the vehicle;
    f) the slidable member having a closed position to block the second port and open the first port, in order to thereby permit flow of fuel to a tank of the vehicle and block flow of fuel to the fuel receiver; and
    g) the slidable member having an open position to open the second port and close the first port, in order to thereby block flow of fuel to a tank of the vehicle and permit flow of fuel to the fuel receiver.

2. The fueling valve of claim 1 further comprising:
    a) the closed position permitting adding fuel to or removing fuel from the tank;
    b) a suction device removing fuel from the tank;
    c) a pressure device adding fuel to the tank;
    d) the housing including a housing cylinder to support the first port and the second port;
    e) the housing cylinder having a closed housing end and an open housing end;
    f) the second port being a tank port;
    g) the tank port being adjacent to the open housing end; and
    h) the first port being a carburetor port to feed fuel to the engine.

3. The fueling valve of claim 2 further comprising:
    a) the tank port being adjacent to the open housing end;
    b) the carburetor port being adjacent to the closed housing end;
    c) the tank port and the carburetor port being on opposing sides of the housing cylinder; and
    d) the carburetor port being closer to the closed housing end than the tank post.

4. The fueling valve of claim 3 further comprising:
a) a male threaded member being adjacent to the open housing end;
b) a valve strap fitting over the male threaded member; and
c) a nut in threaded relation with the male threaded member in order to hold the valve strap in a desired position.

5. The fueling valve of claim 4 further comprising:
a) the valve strap including a housing aperture to receive the male threaded member at a first strap end;
b) the valve strap including a cover cylinder at second strap end with an open cover end and a closed cover end; and
c) the closed cover end being closed by the valve strap.

6. The fueling valve of claim 5 further comprising:
a) the carburetor port having a carburetor nipple at the end thereof to receive a fuel line;
b) the tank port having a supply nipple at the end thereof to receive the fuel line;
c) the sliding member fitting into the open housing end; and
d) the sliding member being generally cylindrical.

7. The fueling valve of claim 6 further comprising:
a) the sliding member having a housing port end oppositely disposed from a fuel supply port end;
b) the housing port end approaching the closed housing end;
c) the sliding member including a fuel passage;
d) the fuel passage extending along a cylindrical axis of the sliding member.

8. The fueling valve of claim 7 further comprising:
a) the housing port end having a first sealing O-ring mounted in a first O-ring slot adjacent to the housing port end;
b) a second sealing O-ring being mounted in a second O-ring slot adjacent to the fuel supply port end;
c) the first sealing O-ring being spaced from the second O-ring slot;
d) an indented passage on the sliding being positioned between the first sealing O-ring and the second sealing O-ring;
e) the indented passage spacing the sliding member from the housing; and
f) the indented passage providing at least part of the fuel passage.

9. In a remote or radio controlled, miniature vehicle requiring a fueling valve comprising:
a) the fueling valve having a housing and a slidable member;
b) the housing receiving the slidable member;
c) the housing having a first port and a second port;
d) the first port being adapted to communicate with a fuel tank of the vehicle;
e) the second port being adapted to communicate with a fuel receiver for an engine of the vehicle;
f) the slidable member having a closed position to block the second port and open the first port, in order to thereby permit flow of fuel to a tank of the vehicle and block flow of fuel to the fuel receiver; and
g) the slidable member having an open position to open the second port and close the first port, in order to thereby block flow of fuel to a tank of the vehicle and permit flow of fuel to the fuel receiver.

10. The vehicle of claim 9 further comprising:
a) the closed position permitting adding fuel to or removing fuel from the tank;
b) a suction device removing fuel from the tank;
c) a pressure device adding fuel to the tank;
d) the housing including a housing cylinder to support the first port and the second port;
e) the housing cylinder having a closed housing end and an open housing end;
f) the first port being a tank port;
g) the tank port being adjacent to the closed housing end; and
h) the second port being a carburetor port to feed fuel to the engine.

11. The vehicle of claim 10 further comprising:
a) the tank port being adjacent to the open housing end;
b) the carburetor port being adjacent to the closed housing end;
c) the tank port and the carburetor port being on opposing sides of the housing cylinder; and
d) the carburetor port being closer to the closed housing end than the tank post.

12. The vehicle of claim 11 further comprising:
a) a male threaded member being adjacent to the open housing end;
b) a valve strap fitting over the male threaded member; and
c) a nut in threaded relation with the male threaded member in order to hold the valve strap in a desired position.

13. The vehicle of claim 12 further comprising:
a) the valve strap including a housing aperture to receive the male threaded member at a first strap end;
b) the valve strap including a cover cylinder at second strap end with an open cover end and a closed cover end; and
c) the closed cover end being closed by the valve strap.

14. The vehicle of claim 13 further comprising:
a) the carburetor port having a carburetor nipple at the end thereof to receive a fuel line;
b) the tank port having a supply nipple at the end thereof to receive the fuel line;
c) the sliding member fitting into the open housing end; and
d) the sliding member being generally cylindrical.

15. The vehicle of claim 14 further comprising:
a) the sliding member having a housing port end oppositely disposed from a fuel supply port end;
b) the housing port end approaching the closed housing end;
c) the sliding member including a fuel passage;
d) the fuel passage extending along a cylindrical axis of the sliding member.

16. The vehicle of claim 15 further comprising:
a) the housing port end having a first sealing O-ring mounted in a first O-ring slot adjacent to the housing port end;
b) the fuel supply port end having a second sealing O-ring mounted in a second O-ring slot adjacent to the fuel supply port end;
c) the first sealing O-ring being spaced from the second O-ring slot;
d) an indented passage on the sliding being positioned between the first sealing O-ring and the second sealing O-ring;
e) the indented passage spacing the sliding member from the housing; and
f) the indented passage providing at least part of the fuel passage.

17. The vehicle of claim 16 further comprising:
a) the first sealing O-ring being positioned adjacent to the closed housing end so fuel may pass from the tank through the indented passage of the sliding member into the carburetor port to permit the vehicle run; and b) the vehicle including the fuel tank connected to the engine by the fuel line.

18. The vehicle of claim 17 further comprising:

a) the fuel line including a first fuel line adjacent and connected to an engine of the vehicle;

b) the fuel line including a second fuel line adjacent to and connected to a fuel tank of the vehicle; and c) the fueling valve connecting the first fuel line to the second fuel line.

* * * * *